(12) United States Patent  
Palinkas et al.

(10) Patent No.: US 7,285,945 B2  
(45) Date of Patent: Oct. 23, 2007

(54) FIXED FILTER ASSEMBLY FOR PROOF OF PERFORMANCE TESTING ON CATV SYSTEMS

(75) Inventors: Raymond Palinkas, Canastota, NY (US); Steven K. Shafer, Chittenango, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 910 days.

(21) Appl. No.: 10/688,655

(22) Filed: Oct. 17, 2003

(65) Prior Publication Data

US 2005/0086701 A1    Apr. 21, 2005

(51) Int. Cl.  
*G01R 23/165* (2006.01)
(52) U.S. Cl. .................................................. 324/76.31
(58) Field of Classification Search ................ 324/543, 324/84, 76.31; 725/107, 110, 105; 348/192  
See application file for complete search history.

(56) References Cited

U.S. PATENT DOCUMENTS

| | | | | |
|---|---|---|---|---|
| 4,558,358 A | * | 12/1985 | Onda | .......................... 725/107 |
| 4,845,447 A | * | 7/1989 | Holdsworth | ................. 333/167 |
| 2003/0022645 A1 | | 1/2003 | Runzo | |

* cited by examiner

*Primary Examiner*—Ha Tran Nguyen  
*Assistant Examiner*—Roberto Velez  
(74) *Attorney, Agent, or Firm*—Marjama Muldoon Blasiak & Sullivan LLP

(57) ABSTRACT

A fixed filter assembly kit includes a plurality of filters with associated terminals inside a case. A booklet disclosing which filters are associated with which terminals as well as technical information about each filter is includes inside the lid. When the case lid is opened, the terminals are available to a user to perform proof of performance testing on a CATV system.

9 Claims, 21 Drawing Sheets

TRAP SPECIFICATIONS

MODEL: SNBP-150/200Mhz                PREP. BY S.S.        DATE:   02/07/03
RESPONSE: SAMPLE                      MINIMUM OPERATING FREQUENCY:  1 Ghz

| MARKER # | FREQ. DESC. | FREQ. MHz | TYP. LOSS(dB) | LIMITS(dB) |
|---|---|---|---|---|
| 1 |  | 121 | 57 | 50 MIN. |
| 2 |  | 124.8 | 40 | 40 REF. |
| 3 |  | 127.4 | 30 | 30 REF. |
| 4 |  | 150 | 2.8 | 3.0 MAX. |
| 5 |  | 200 | 2.8 | 3.0 MAX. |
| 6 |  | 226.7 | 30 | 30 REF. |
| 7 |  | 231.4 | 40 | 40 REF. |
| 8 |  | 240 | 62 | 50 MIN. |

TRAP SPECIFICATIONS

MODEL: SNBP-400/450Mhz        PREP. BY S.S.        DATE:    02/07/03
RESPONSE: SAMPLE                          MINIMUM OPERATING FREQUENCY:  1 Ghz

| MARKER # | FREQ. DESC. | FREQ. MHz | TYP. LOSS(dB) | LIMITS(dB) |
|---|---|---|---|---|
| 1 | | 335 | 57 | 50 MIN. |
| 2 | | 342.9 | 40 | 40 REF. |
| 3 | | 349.1 | 30 | 30 REF. |
| 4 | | 400 | 2.2 | 3.0 MAX |
| 5 | | 450 | 2.0 | 3.0 MAX |
| 6 | | 522.7 | 30 | 30 REF. |
| 7 | | 535.7 | 40 | 40 REF. |
| 8 | | 545 | 59 | 50 MIN. |

FIXED FILTER ASSEMBLY FOR PROOF OF PERFORMANCE TESTING ON CATV SYSTEMS

FIELD OF THE INVENTION

This invention relates generally to the field of proof of performance testing on CATV systems, and more particularly to a fixed filter assembly to perform such testing.

BACKGROUND OF THE INVENTION

So called proof of performance testing in a cable television or CATV system includes what is sometimes known as signal validation and leakage detection. CATV systems deliver RF (radio frequency) television signals to subscribers or viewers by means of coaxial cable. In the past, conflict arose between CATV operators and the aviation industry because many of the frequencies used by the CATV operators to carry television signals are also used by the aviation industry. Conventional coaxial cable distribution systems use the 55 MHz to 1 GHz frequency spectrum for forward path signals and under 55 MHz for return path signals. When signals leak from the CATV distribution system, the signals can interfere with aviation signals if the leaked signals are of sufficient strength. For this reason, CATV operators are required by the FCC to test their CATV systems upon installation and periodically to ensure that any leakage that occurs is within regulated limits. Such testing is outlined and required by 65 CFR 76.601 et seq., "Subpart K-Technical Standards", incorporated herein by reference.

During testing, a pre-selector filter is used to improve carrier noise ratios by removing out of band interference and noise. Pre-selector filters are one or more of the filter types listed in Table A.

TABLE A

| Filter Type | Effect |
|---|---|
| Bandpass | Passes only a desired segment of band and rejects frequencies above and below the desired passband. |
| Lowpass | Passes from a certain frequency and lower, while rejecting unwanted carriers above the certain frequency. |
| Highpass | Passes from a certain frequency and higher, while rejecting unwanted carriers below the certain frequency. |
| Notch | Removes a very small segment of band while passing frequencies above and below the band. |
| Bandstop | Removes a larger segment of band than a notch filter and passes frequencies above and below the band. |

The first testing procedure consisted of carrying a wide range of fixed filters to the test site and connecting each filter sequentially to test the CATV system over the required frequency ranges. The disadvantages inherent in this procedure led to other testing devices.

A known tunable RF preselector used to test both the forward and return CATV paths is the VF-5 from Trilithic, Inc., Indianapolis, Ind. which tests the forward path using four tunable filters which cover four bands in the 55-880 MHz range and tests the return path using six fixed channel filters, T7 through T12. Although the device is portable, it is still bulky because of the electronics required for the tunable filters.

A known automated preselector filter is the DCVF-5, also from Trilithic, Inc., Indianapolis, Ind. Based on the manual preselector VF-5, the DCVF-5 offers automatic switching signal paths through T7-T13 fixed filters and tuning the 55-800 MHz variable filter bank under GPIB and front panel user control. The device is 17" wide by 10.5" high by 20" deep, and the weight of the device is 45 lbs.

Neither of these preselector filters are truly convenient to use due to the bulk and weight of the devices.

SUMMARY OF THE INVENTION

Briefly stated, a fixed filter assembly kit includes a plurality of filters with associated cable terminal connectors inside a case. A booklet disclosing which filters are associated with which terminal connectors as well as technical information about each filter is included inside the lid. When the case lid is opened, the terminal connectors are available to a user to perform proof of performance testing on a CATV system.

According to an embodiment of the invention, a fixed filter assembly kit includes a case; the case including a case body and a case lid; a plurality of filters contained inside the case body; and a plurality of cable terminal connectors wherein each terminal connector is connected to a different specific one of the plurality of filters; wherein the plurality of cable terminal connectors are accessible to a user when the case lid is opened away from the case body.

DETAILED DESCRIPTION OF THE PREFERRED EMBODIMENT

Figure 1:
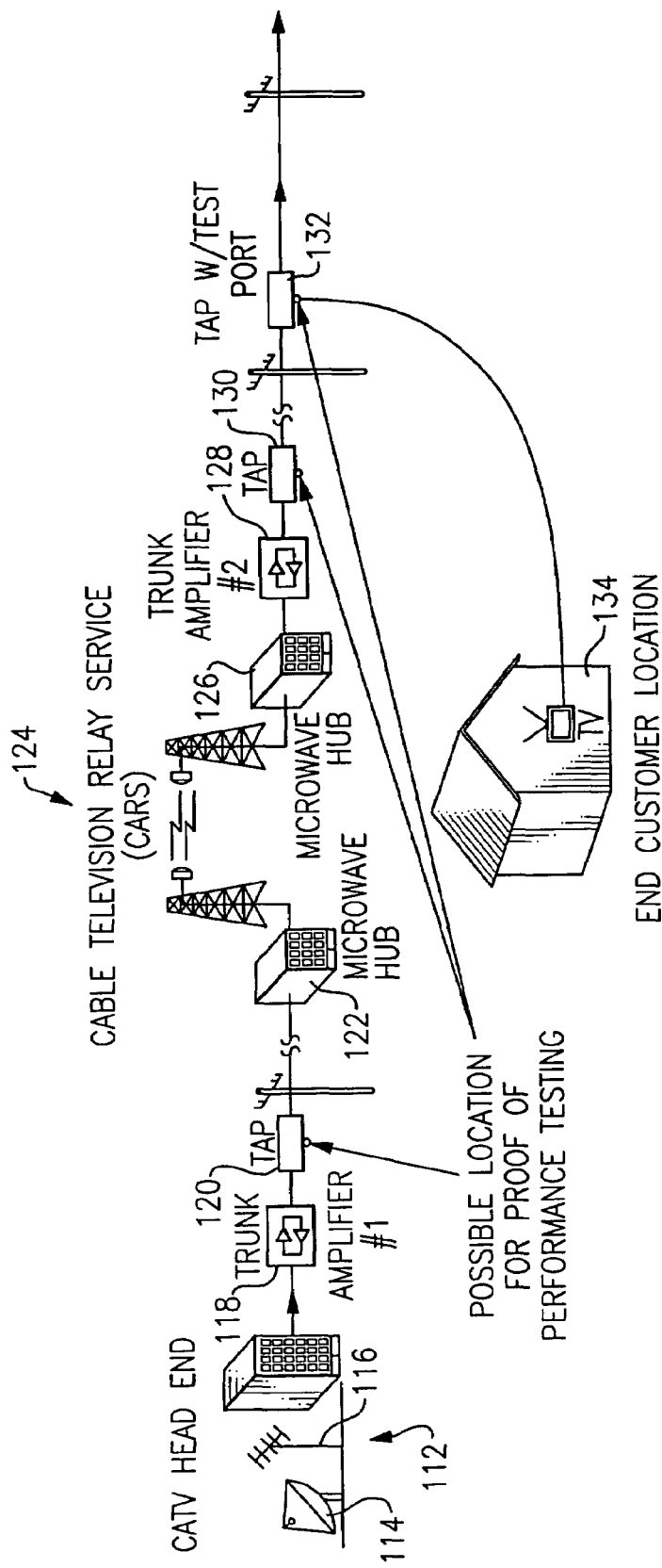
FIG. 1 shows a CATV system extending from a CATV head end to a customer location end, with possible for proof of performance testing sites at various locations.

Referring to FIG. 1, a cable TV (CATV) system 110 is shown which includes a CATV head end 112 where a TV signal is received via a satellite dish 114 or antenna 116. The main signal is amplified by a trunk amplifier 118 after which a first branch signal is tapped off the main signal by a tap 120. The first branch signal is routed to a microwave hub 122, transmitted over a microwave link 124, and routed to a microwave hub 126. The first branch signal is amplified by a trunk amplifier 128 before a second branch signal is tapped off using a tap 130. A customer signal is tapped off the second branch signal using a tap 132, with the customer signal ending up at the end customer location 134. The ideal spots for proof of performance testing is at taps 120, 130, and 132.

Figure 2:
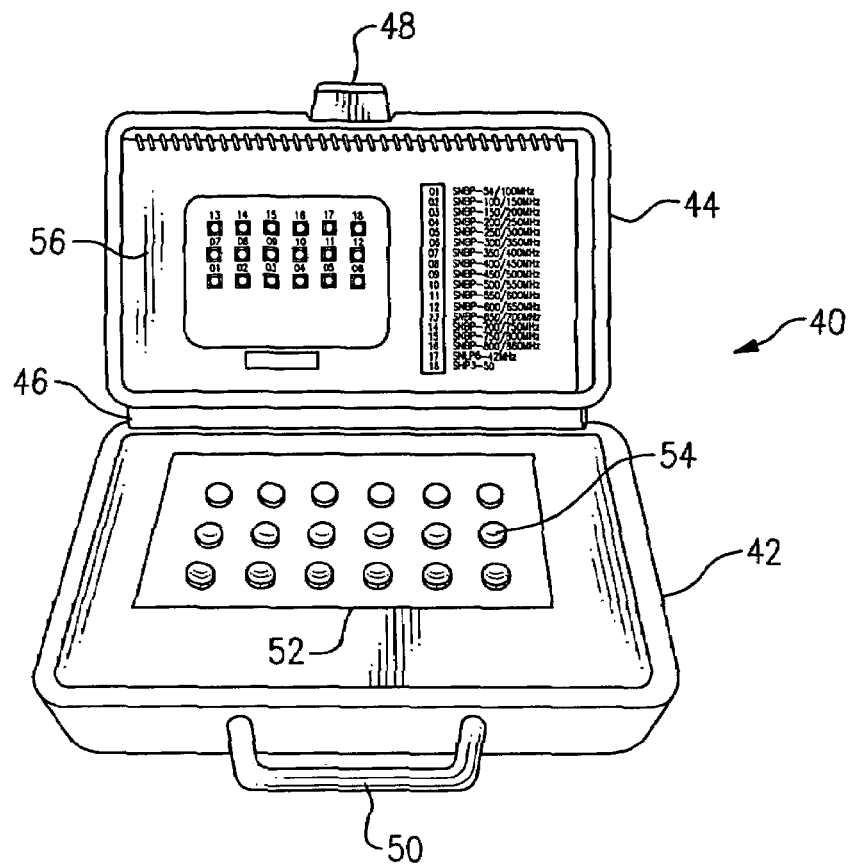
FIG. 2 shows a front perspective view of an embodiment of the invention with the case lid open.
Figure 3:
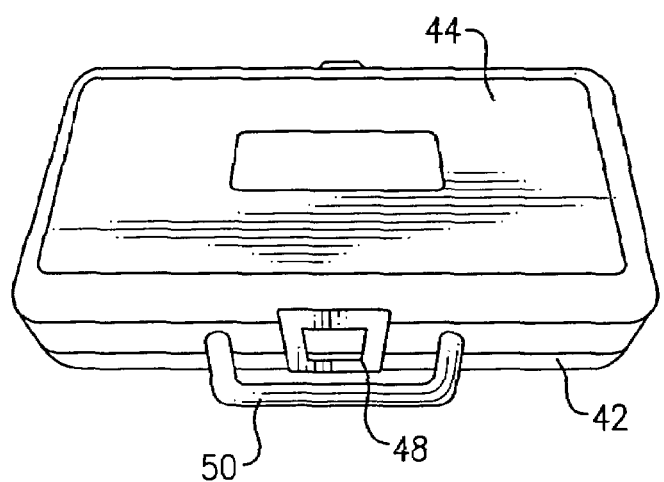
FIG. 3 shows a front perspective view of the embodiment of FIG. 2 with the case lid closed.

Referring to FIGS. 2-3, a CATV pre-selector kit 40 is shown according to an embodiment of the invention. A case lid 44 is connected to a case body 42 via a hinge 46. Case lid 44 preferably includes a latch 48, while case body 42 preferably includes a handle 50. Case lid 44 and case body 42 are preferably of plastic, with hinge 46 preferably a living hinge. Latch 48 and handle 50 are also preferably of plastic.

Affixed within case body 42 is a terminal portion 52 which contains a plurality of terminals 54, each of which is connected to a different filter. Case lid 44 preferably stores a booklet 56 which contains the technical data pertaining to the terminals and filters stored in kit 40.

Figure 4:
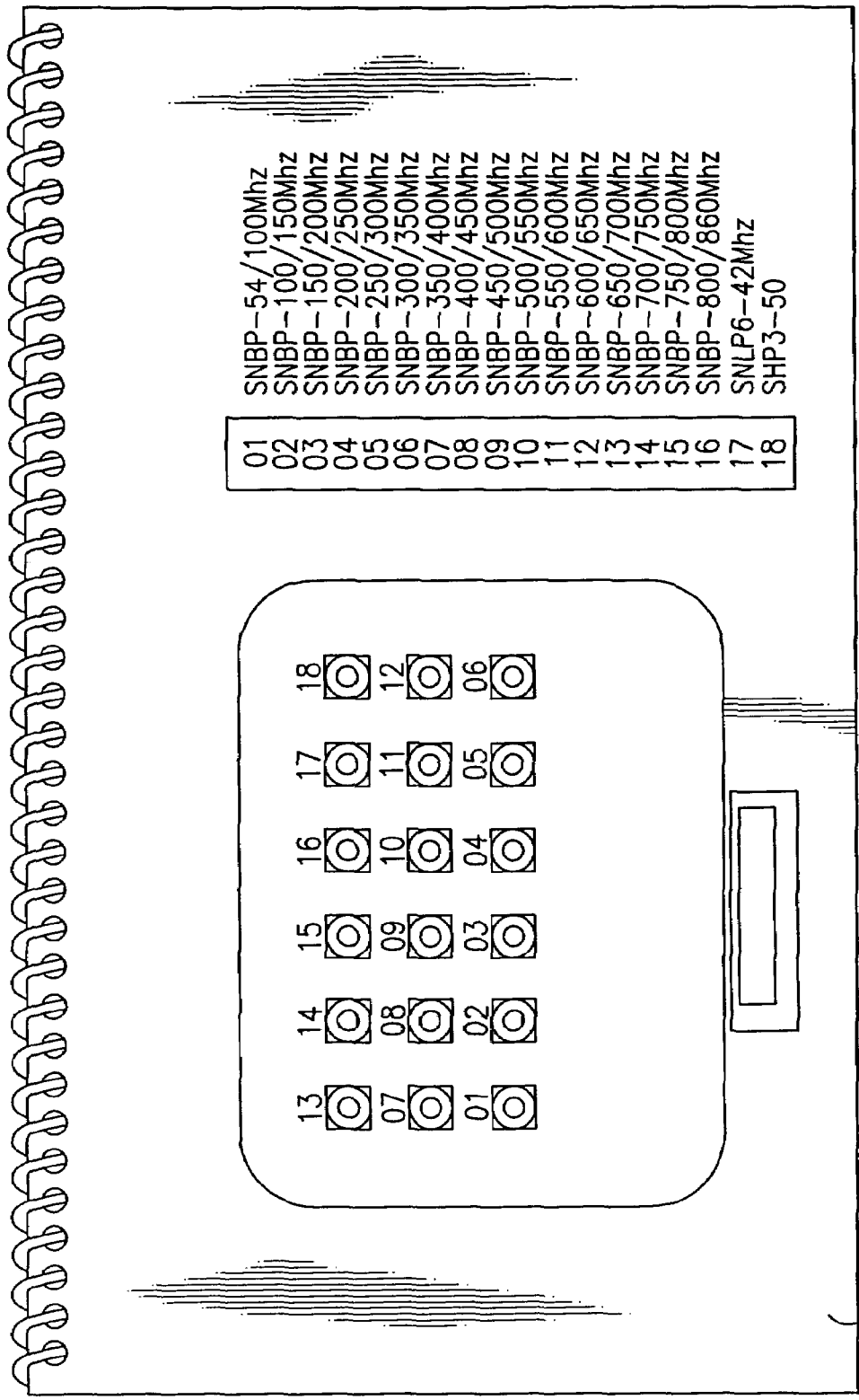
FIG. 4 shows a cover of a booklet that is preferably contained within the case lid of the embodiment of FIG. 1.
Figure 5:
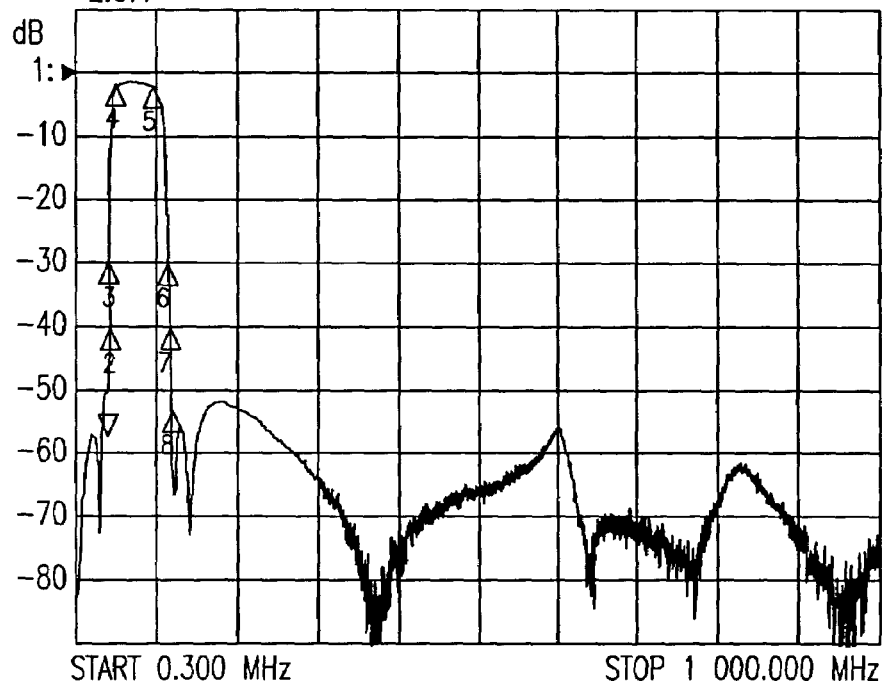
FIGS. 5-22 show trap specifications for the fixed channel filters contained within the embodiment of FIG. 1.
Figure 6:
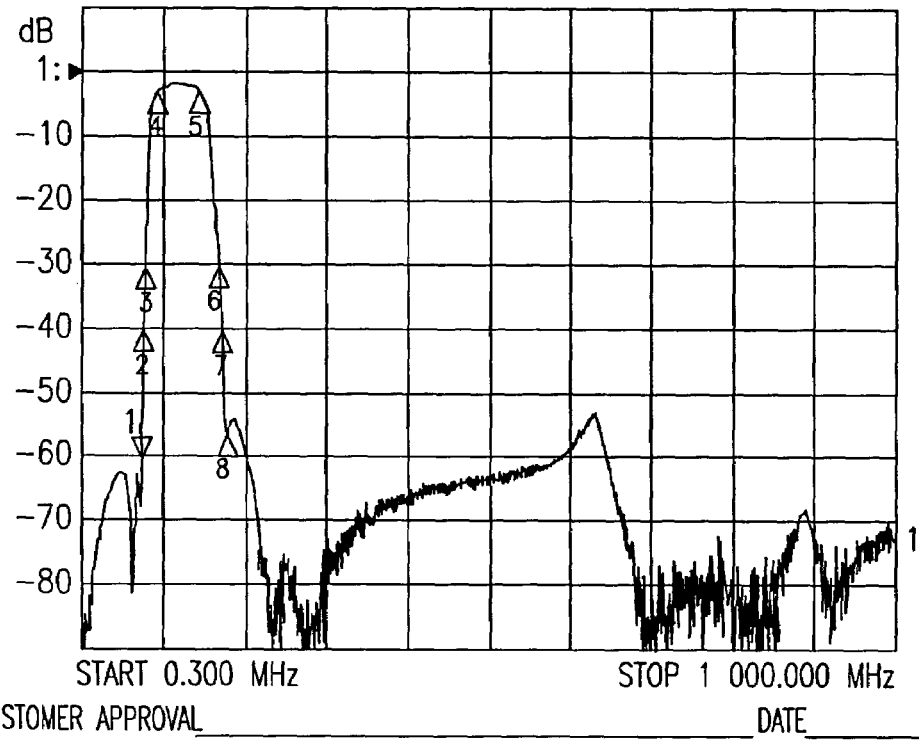
Figure 7:
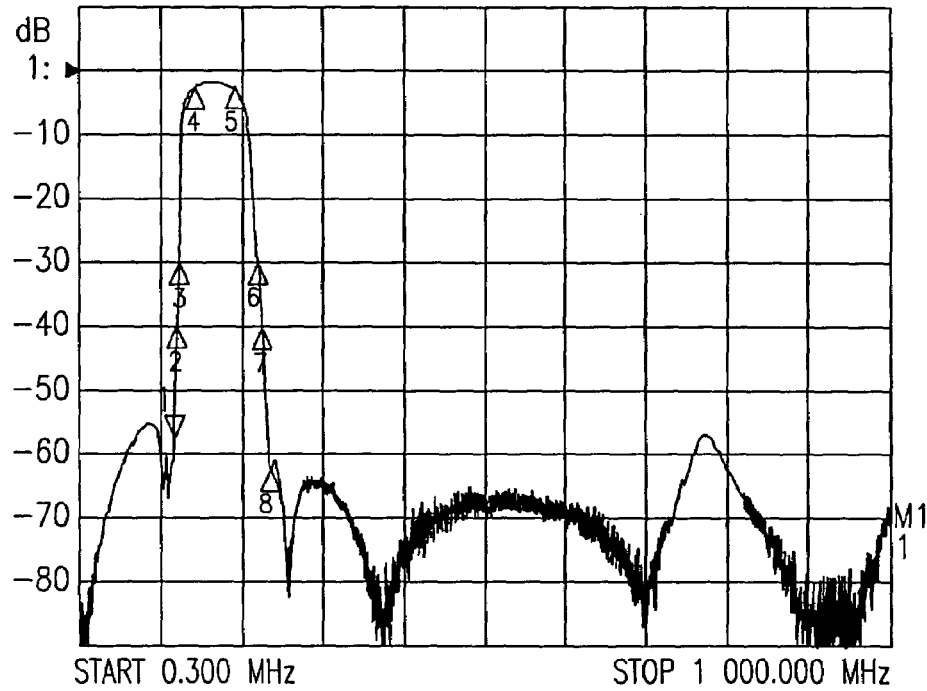
Figure 8:
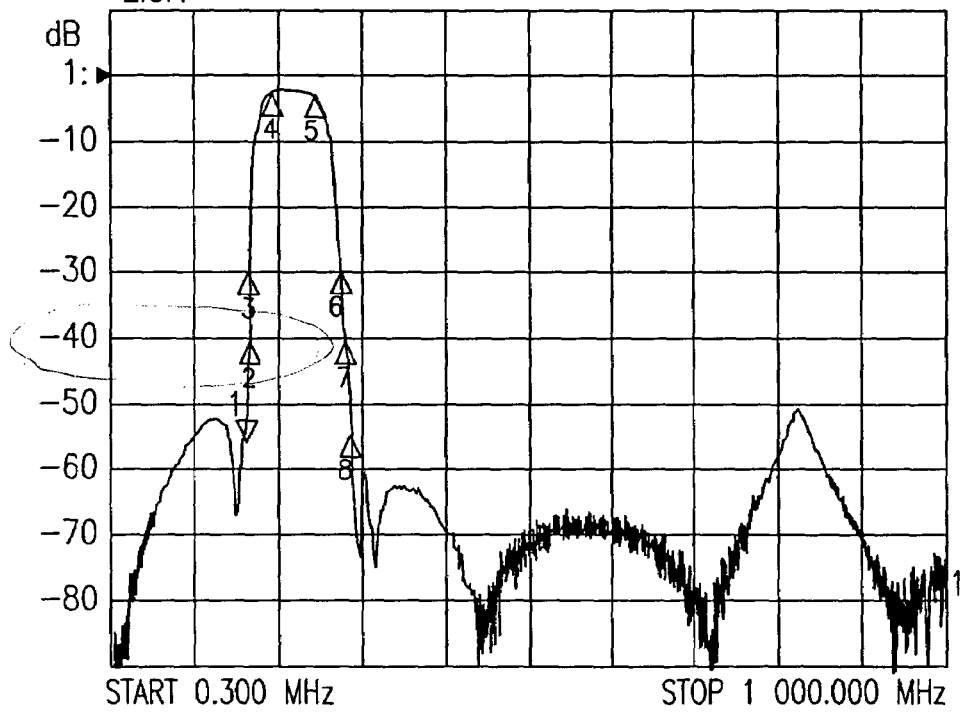
Figure 9:
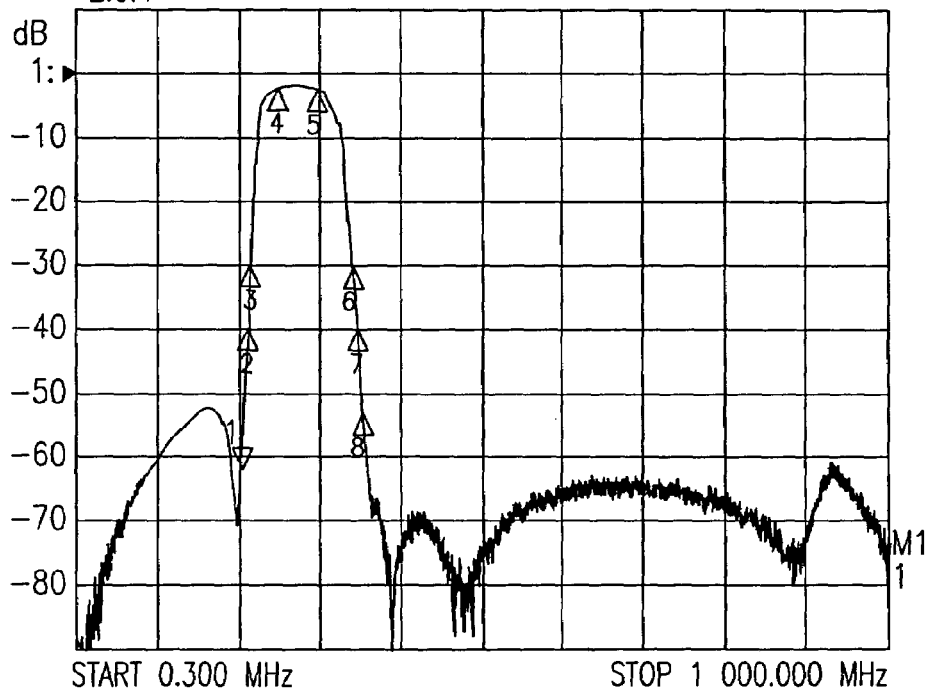
Figure 10:
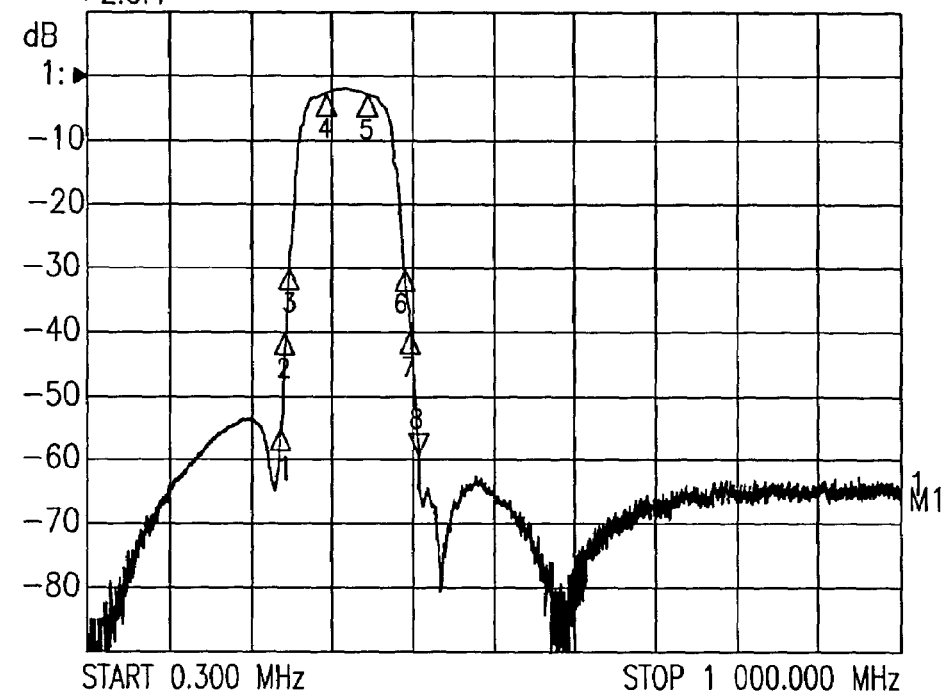
Figure 11:
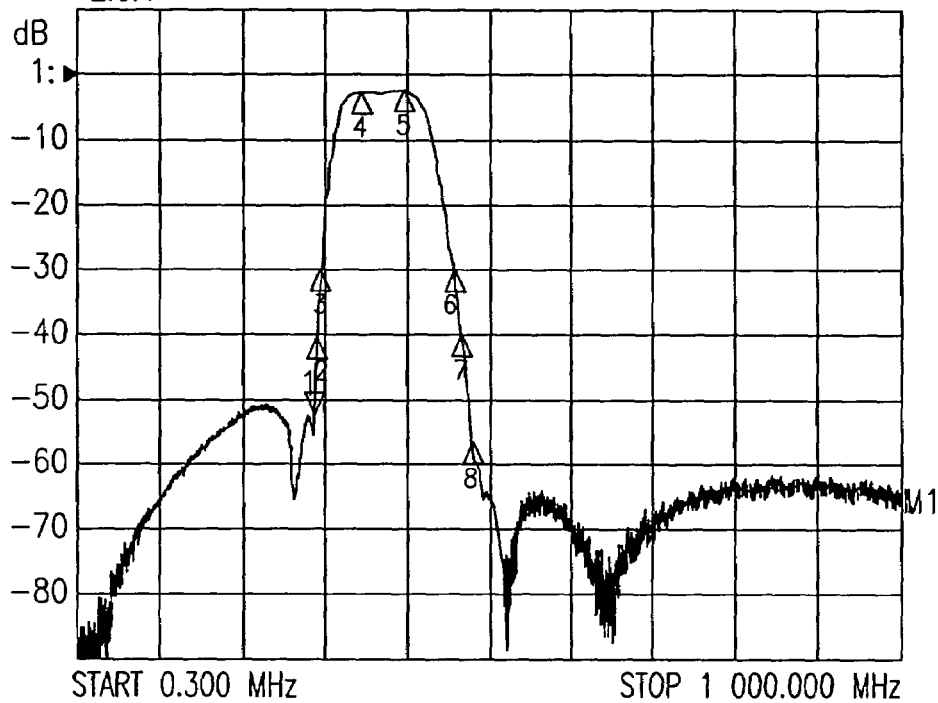
Figure 12:
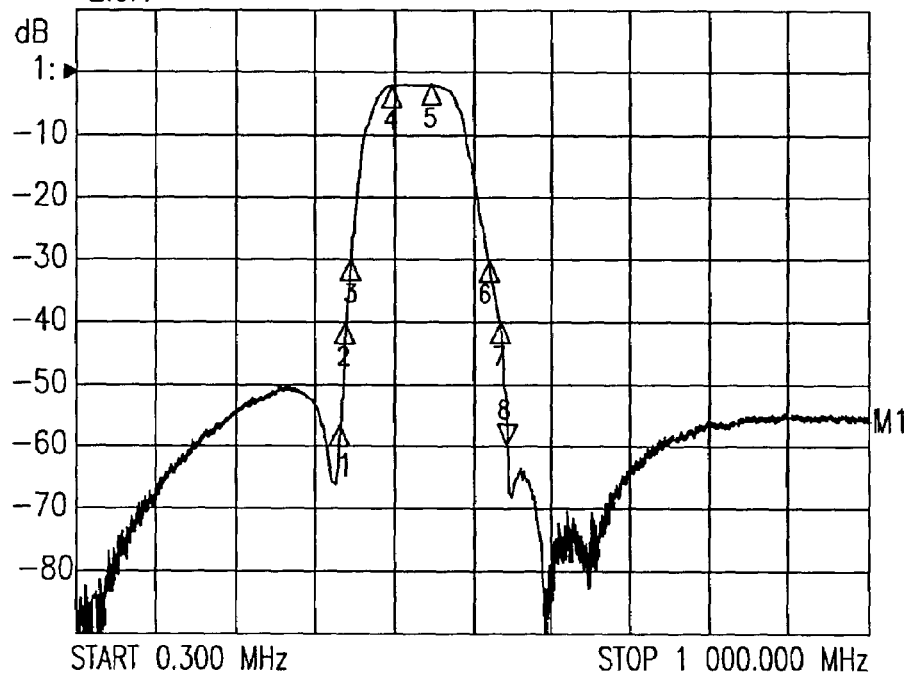
Figure 13:
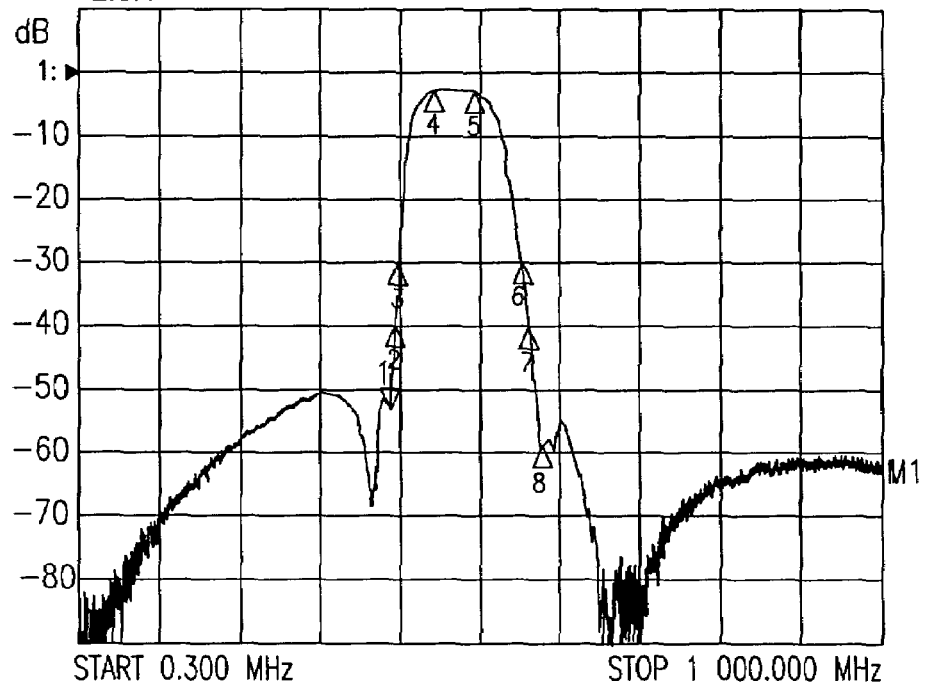
Figure 14:
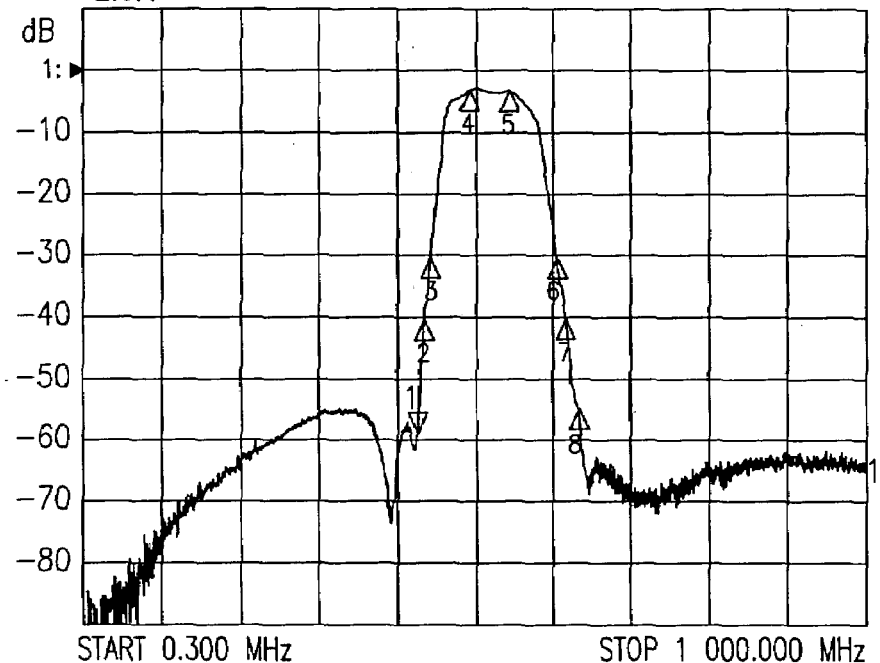
Figure 15:
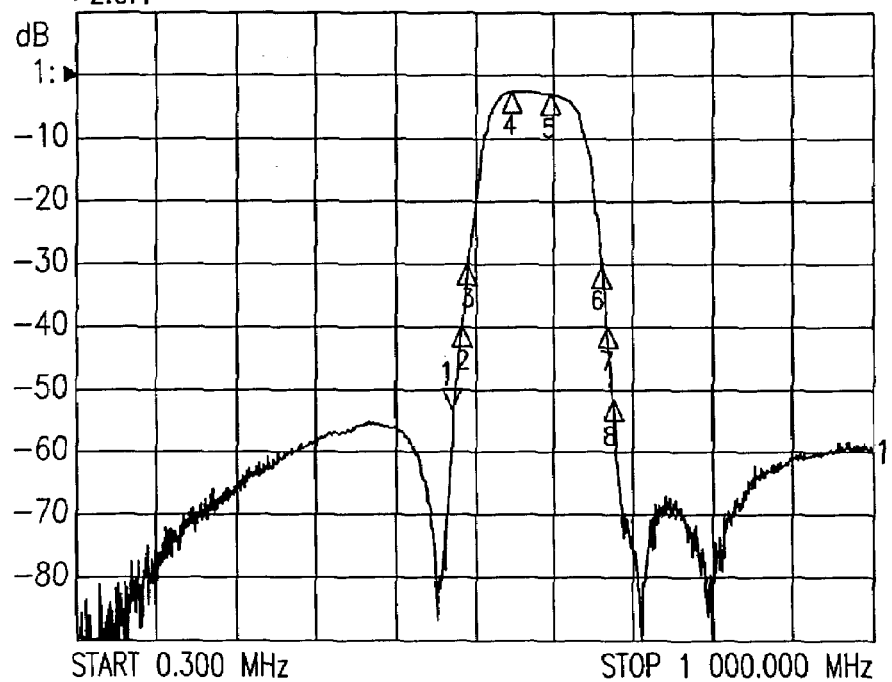
Figure 16:
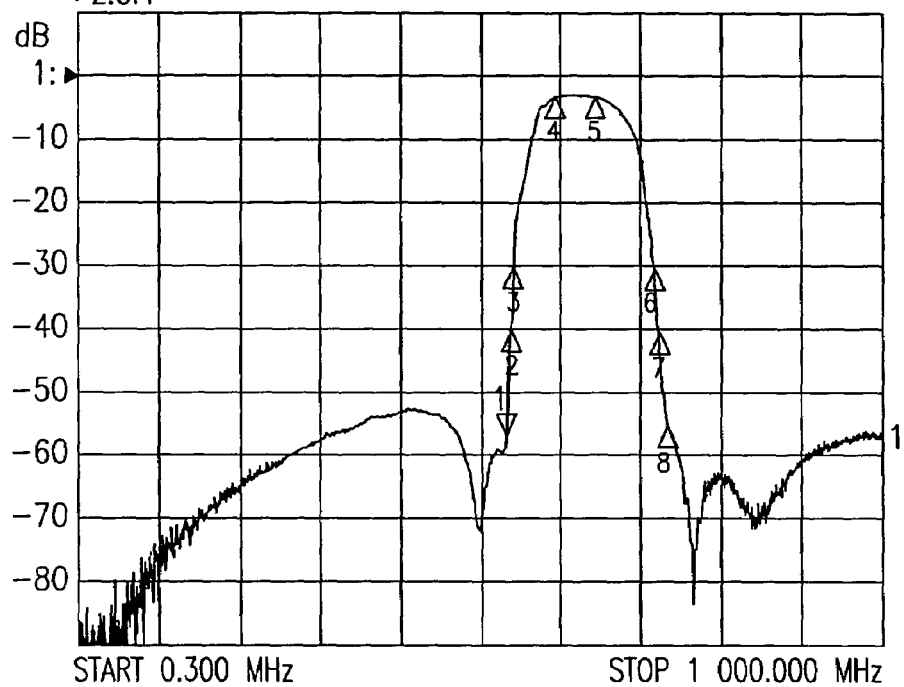
Figure 17:
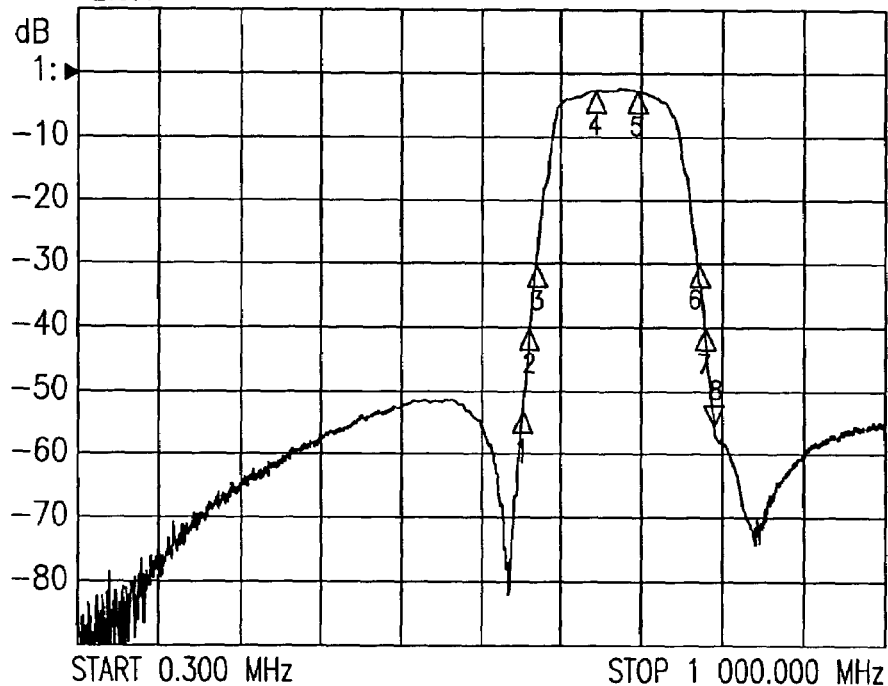
Figure 18:
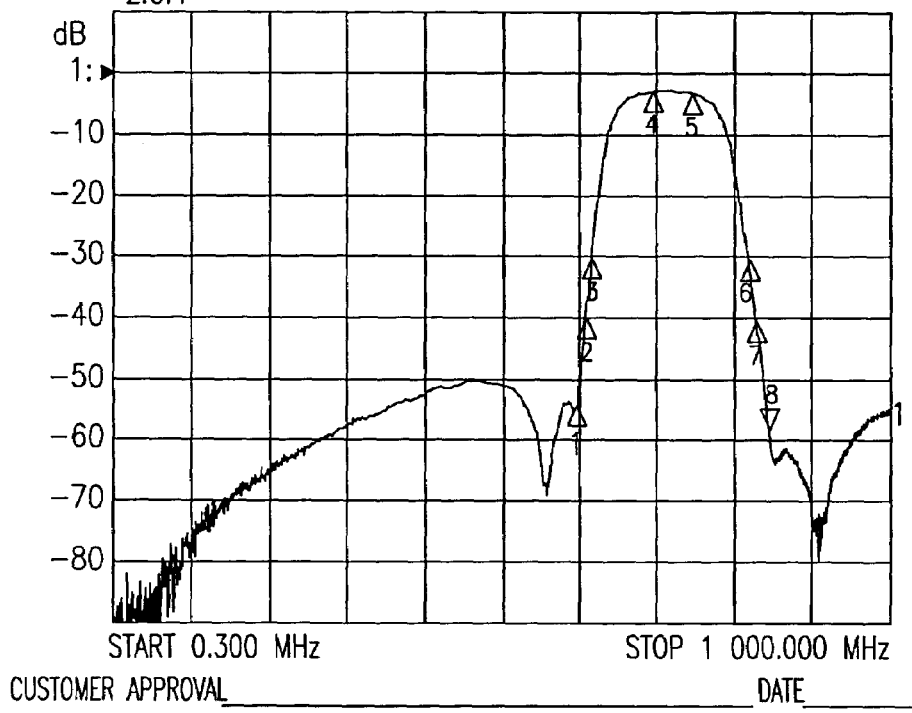
Figure 19:
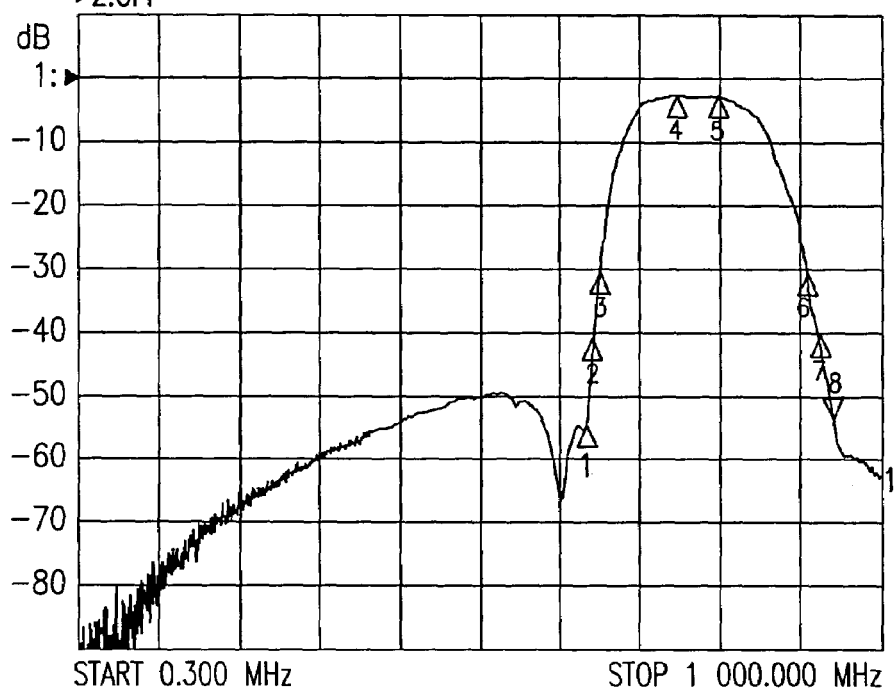
Figure 20:
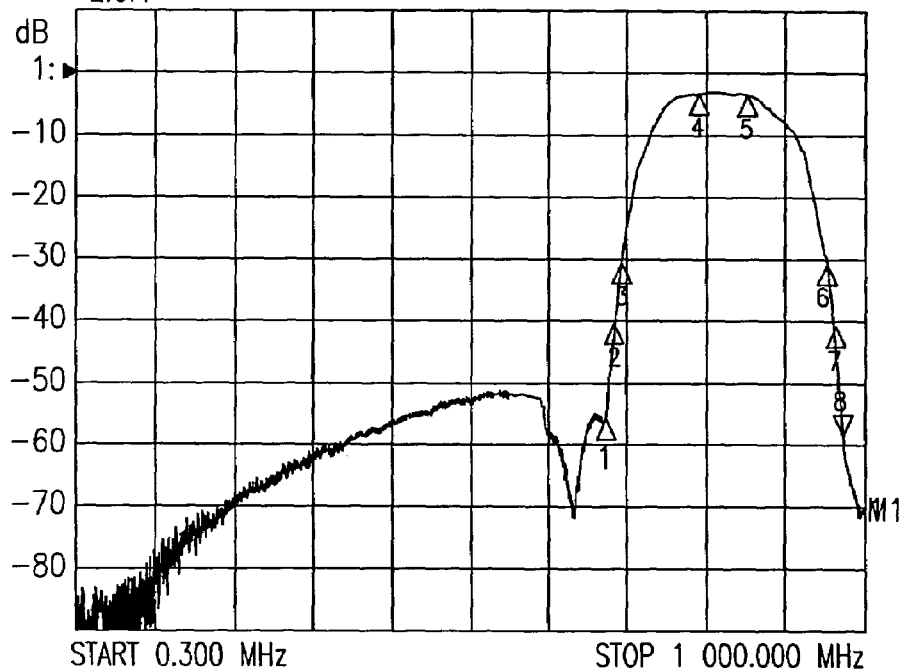
Figure 21:
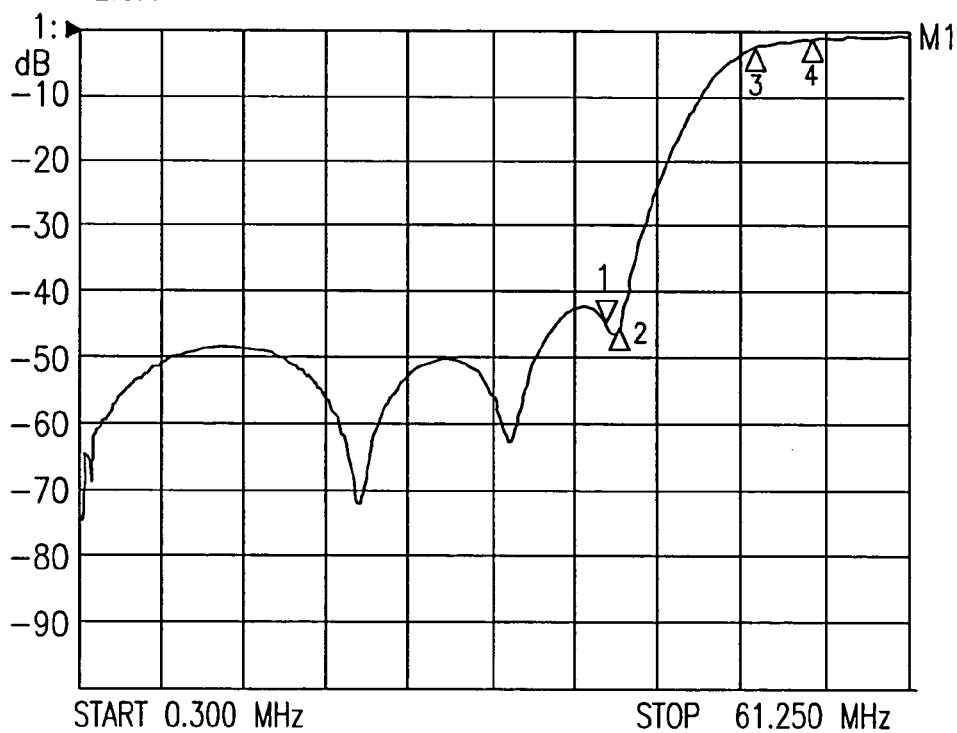
Figure 22:
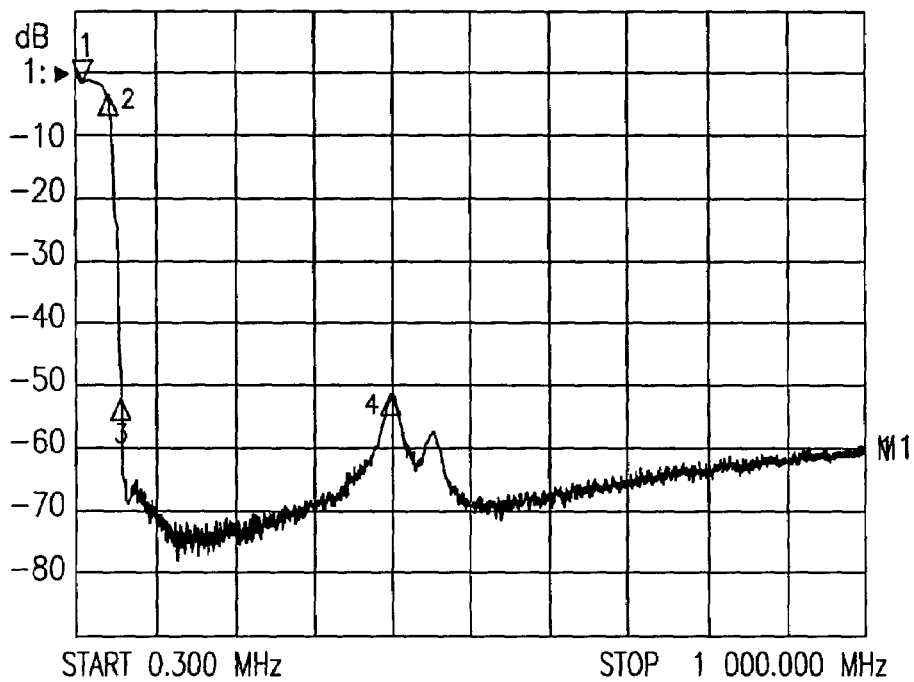

Referring to FIG. 4, a front of booklet 56 is shown, in which the terminals referenced correspond to the plurality of terminals 54 shown in FIG. 2. The particular location of which terminal corresponds to which filter is not important, while the range of each of the pre-selected filters is considered preferable. Table B shows the connections between each terminal and filter.

TABLE B

| Terminal | Filter |
| --- | --- |
| 01 | SNBP-54/100 MHz |
| 02 | SNBP-100/150 MHz |
| 03 | SNBP-150/200 MHz |
| 04 | SNBP-200/250 MHz |
| 05 | SNBP-250/300 MHz |
| 06 | SNBP-300/350 MHz |
| 07 | SNBP-350/400 MHz |
| 08 | SNBP-400/450 MHz |
| 09 | SNBP-450/500 MHz |
| 10 | SNBP-500/550 MHz |
| 11 | SNBP-550/600 MHz |
| 12 | SNBP-600/650 MHz |
| 13 | SNBP-650/700 MHz |
| 14 | SNBP-700/750 MHz |
| 15 | SNBP-750/800 MHz |
| 16 | SNBP-800/850 MHz |
| 17 | SNLP6-42 MHz |
| 18 | SHP3-50 MHz |

The frequency ranges for each filter are noted. The SNLP6-42 MHz is a low pass filter while SHP3-50 MHz is a high pass filter. Detailed specifications for each filter are shown in FIGS. 5-22.

The advantages of the pre-selector filter kit of the present invention over the tunable pre-selectors described in the background section above are (1) the price for the pre-selector kit is much lower, (2) the fixed filters in the pre-selector kit are optimized at a specific frequency and band to give better performance, since the tunable filters compromise selectivity and insertion loss in order to be tunable over a wide range, and (3) the filters in the pre-selector kit contain no moving parts which wear out, thus providing a much higher MTBF (mean time between failures) rating.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A fixed filter assembly kit, comprising: a case; said case including a case body and a case lid; a plurality of filters contained inside said case body; and a plurality of terminals wherein each terminal is connected to a different specific one of said plurality of filters; wherein said plurality of terminals are accessible to a user when said case lid is opened away from said case body; and wherein said plurality of filters include eighteen filters, with sixteen of said eighteen filters consisting of narrow band pass filters in the ranges of 54-100 MHz, 100-150 MHz, 150-200 MHz, 200-250 MHz, 250-300 MHz, 300-350 MHz, 350-400 MHz, 400-450 MHz, 450-500 MHz, 500-550 MHz, 550-600 MHz, 600-650 MHz, 650-700 MHz, 700-750 MHz, 750-800 MHz, 800-850 MHz, one low-pass filter in the range of 6-42 MHz, and one high-pass filter in the range of 3-50 MHz.

2. A fixed filter assembly kit according to claim 1, further comprising a booklet stored inside said case lid, wherein said booklet contains information disclosing which terminal is associated with which filter, and wherein said booklet further contains information disclosing technical details about each of said plurality of filters.

3. A fixed filter assembly kit according to claim 2, further comprising:
   connecting means for connecting said case body to said case lid; and
   means for latching said case lid to said case body.

4. A fixed filter assembly kit according to claim 3, wherein said case body and said case lid are of plastic, and wherein said connecting means consists of a living hinge.

5. A fixed filter assembly kit according to claim 1, further comprising:
   connecting means for connecting said case body to said case lid; and
   means for latching said case lid to said case body.

6. A fixed filter assembly kit according to claim 5, wherein said case body and said case lid are of plastic, and wherein said connecting means consists of a living hinge.

7. A fixed filter assembly according to claim 1, wherein said plurality of terminals are connectable to a CATV cable.

8. A fixed filter assembly kit according to claim 7, wherein said CATV cable is hardline cable.

9. A fixed filter assembly kit according to claim 7, wherein said CATV cable is dropline cable.

\* \* \* \* \*